(12) United States Patent
Spuller

(10) Patent No.: US 9,987,782 B2
(45) Date of Patent: Jun. 5, 2018

(54) HOT RUNNER NOZZLE WITH A SEGMENTED HEATER

(71) Applicant: Otto Männer Innovation GmbH, Bahlingen (DE)

(72) Inventor: Swen Spuller, Forchheim (DE)

(73) Assignee: OTTO MÄNNER INNOVATION GMBH, Bahlingen (DE)

( * ) Notice: Subject to any disclaimer, the term of this patent is extended or adjusted under 35 U.S.C. 154(b) by 615 days.

(21) Appl. No.: 14/483,029

(22) Filed: Sep. 10, 2014

(65) Prior Publication Data

US 2015/0071626 A1    Mar. 12, 2015

(30) Foreign Application Priority Data

Sep. 10, 2013   (EP) ..................................... 13183824

(51) Int. Cl.
| | | |
|---|---|---|
| *E03B 7/10* | (2006.01) | |
| *B05B 1/24* | (2006.01) | |
| *B29C 45/27* | (2006.01) | |
| *B28B 1/00* | (2006.01) | |
| *H05B 3/12* | (2006.01) | |

(Continued)

(52) U.S. Cl.
CPC ............ *B29C 45/2737* (2013.01); *B28B 1/00* (2013.01); *H05B 3/12* (2013.01); *H05B 3/46* (2013.01); *H05B 3/48* (2013.01); *B29C 2045/2743* (2013.01); *B29C 2045/2748* (2013.01);

(Continued)

(58) Field of Classification Search
None
See application file for complete search history.

(56) References Cited

U.S. PATENT DOCUMENTS

| | | | | |
|---|---|---|---|---|
| 4,641,423 A | * | 2/1987 | Crandell ............ | B22D 17/2272 156/273.7 |
| 4,795,126 A | * | 1/1989 | Crandell ............ | B22D 17/2272 219/424 |

(Continued)

FOREIGN PATENT DOCUMENTS

| | | |
|---|---|---|
| CN | 102343645 A | 2/2012 |
| CN | 20262317 U | 12/2012 |

(Continued)

OTHER PUBLICATIONS

English language abstract from the Espacenet-Database of the European Patent Office of KR20100005796.

(Continued)

*Primary Examiner* — Thor Campbell
(74) *Attorney, Agent, or Firm* — Slayden Grubert Beard PLLC

(57) ABSTRACT

A nozzle heater assembly coupled to a hot runner nozzle includes a heater support made of at least two support segments spaced apart by a gap. A heater element secured to both support segments is configured to limit the gap between the two segments. The nozzle heater assembly to be coupled to a hot runner may also include in other applications a heater support formed of a single piece and configured as a hollow helical tube including at least two axial gaps. A heater element is secured to the helical tube, where the helical tube can be compressed or stretched axially to alter a clamping force generated when the helical tube and the heater are coupled to the hot runner nozzle.

16 Claims, 23 Drawing Sheets

(51) Int. Cl.
*H05B 3/46* (2006.01)
*H05B 3/48* (2006.01)

(52) U.S. Cl.
CPC .. *H05B 2203/014* (2013.01); *H05B 2203/017* (2013.01); *Y10T 29/49002* (2015.01)

(56) References Cited

U.S. PATENT DOCUMENTS

| | | | | |
|---|---|---|---|---|
| 5,360,333 | A * | 11/1994 | Schmidt | H05B 3/42 264/328.15 |
| 5,558,888 | A * | 9/1996 | Beck | H05B 3/58 264/328.15 |
| 5,973,296 | A * | 10/1999 | Juliano | B29C 45/2737 219/424 |
| 6,022,210 | A * | 2/2000 | Gunther | B29C 45/2737 264/328.15 |
| 6,043,466 | A * | 3/2000 | Jenko | B29C 45/1782 138/33 |
| 6,163,016 | A * | 12/2000 | Johnson | B29C 45/1782 219/424 |
| 6,222,166 | B1 * | 4/2001 | Lin | H05B 3/262 219/538 |
| 6,323,465 | B1 * | 11/2001 | Gellert | B29C 45/2737 219/421 |
| 6,409,497 | B1 * | 6/2002 | Wurstlin | B29C 45/1782 264/328.15 |
| 6,797,925 | B1 * | 9/2004 | Gunther | B29C 45/2737 219/424 |
| 7,034,258 | B2 * | 4/2006 | Sutorius | B29C 45/2737 219/535 |
| 7,125,243 | B2 * | 10/2006 | Sicilia | B29C 45/2737 264/328.15 |
| 7,241,131 | B1 * | 7/2007 | Booth | B29C 45/2737 219/543 |
| 7,252,498 | B2 * | 8/2007 | Olaru | B29C 45/27 264/328.15 |
| 7,377,768 | B2 * | 5/2008 | Gellert | B23P 15/007 264/328.15 |
| 7,527,490 | B2 * | 5/2009 | Fairy | B29C 45/1603 425/130 |
| 7,559,760 | B2 * | 7/2009 | Tabassi | B29C 45/27 425/549 |
| 7,601,935 | B2 * | 10/2009 | Fennewald | B29C 45/2737 118/621 |
| 7,810,550 | B2 * | 10/2010 | Erhard | B22D 17/04 164/316 |
| 8,022,339 | B2 * | 9/2011 | Schlipf | H05B 3/46 219/535 |
| 8,536,496 | B2 * | 9/2013 | Ptasienski | B29C 45/2737 219/476 |
| 8,840,395 | B2 * | 9/2014 | Sommer | B29C 45/74 425/549 |
| 8,905,741 | B2 * | 12/2014 | Spuller | B29C 45/2737 425/143 |
| 2004/0071814 | A1 * | 4/2004 | Babin | B29C 45/2737 425/549 |
| 2004/0197437 | A1 * | 10/2004 | Olaru | B29C 45/27 425/549 |
| 2005/0104242 | A1 * | 5/2005 | Olaru | B29C 45/2737 264/40.6 |
| 2008/0138053 | A1 * | 6/2008 | Russegger | B29C 45/2737 392/473 |
| 2008/0241298 | A1 * | 10/2008 | Fischer | B29C 45/278 425/143 |
| 2009/0032519 | A1 | 2/2009 | Schlipf | |
| 2010/0092595 | A1 * | 4/2010 | Gunther | B29C 45/1782 425/170 |
| 2011/0180529 | A1 | 7/2011 | Schlipf | |
| 2013/0306686 | A1 * | 11/2013 | Manner | B29C 45/27 222/591 |
| 2014/0042148 | A1 * | 2/2014 | Spuller | H05B 3/42 219/535 |

FOREIGN PATENT DOCUMENTS

| | | |
|---|---|---|
| CN | 202805585 U | 3/2013 |
| CN | 204222111 U | 3/2015 |
| DE | 2347987 A1 | 4/1975 |
| DE | 44 04 894 C1 | 1/1995 |
| DE | 20 2007 010 865 U1 | 10/2007 |
| DE | 20 2010 001 370 U1 | 5/2010 |
| EP | 0 338 664 A | 10/1989 |
| KR | 2010 0005796 A | 1/2010 |
| KR | 20100005796 A | 1/2010 |

OTHER PUBLICATIONS

English language abstract from the Espacenet-Database of the European Patent Office of DE4404894.
Extended European Search Report of EP14184332.6.
Office Action of the Chinese Patent Office in Application 201410458195.4 with translation.

* cited by examiner

A'-A'

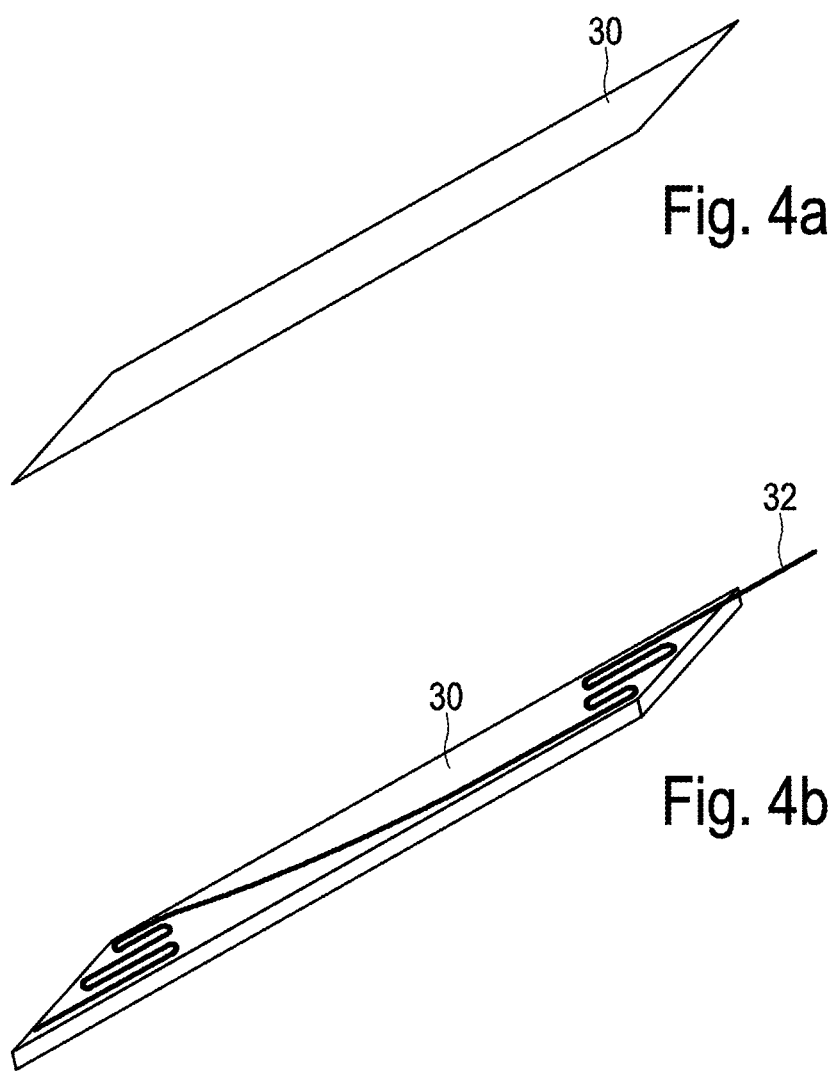

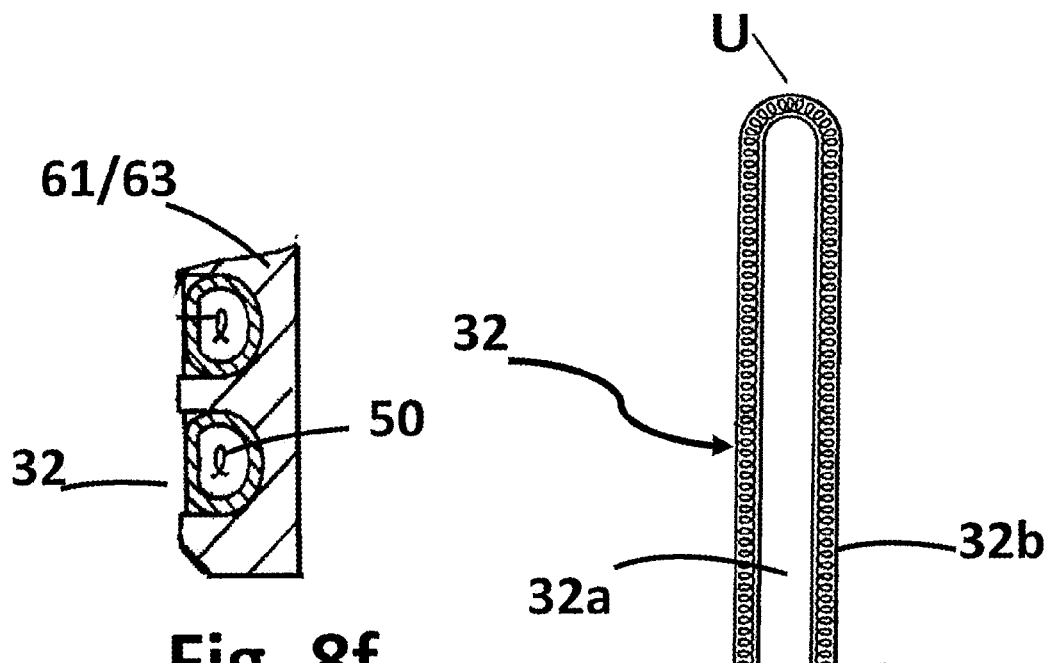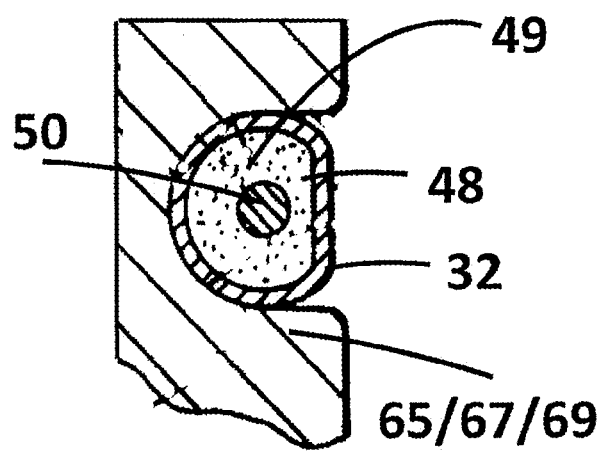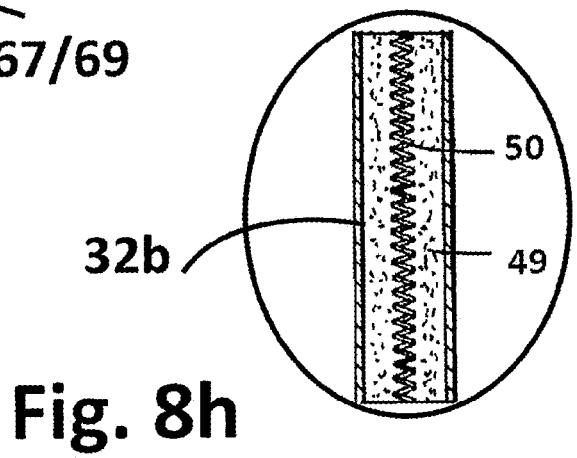

HOT RUNNER NOZZLE WITH A SEGMENTED HEATER

CROSS-REFERENCE TO RELATED APPLICATION

The present utility patent application claims the priority benefit of European patent application EP 13183824.5 filed on Sep. 10, 2013. The contents of said European patent application EP 13183824.5 as well as the contents of European patent application "HOT RUNNER NOZZLE WITH A SEGMENTED HEATER" filed on Sep. 10, 2014 in the name of Otto Männer Innovation GmbH, Bahlingen am Kaiserstuhl, Germany, are incorporated herein by reference for all purposes to the extent that such subject matter is not inconsistent herewith or limiting hereof.

TECHNICAL FIELD

This invention is related to an injection molding apparatus. More particularly this invention is related to a nozzle heater assembly and to a method of manufacturing a nozzle heater assembly.

BACKGROUND

Heaters for hot runner nozzles are known. In some applications the nozzle heater is embedded in the nozzle body or attached to the nozzle body. In other applications the nozzle heater is composed of a support element such as a sleeve or a tube and a heating element is coupled, for example secured to the inside or outside of the sleeve or tube.

When the hot runner nozzle is placed in a hot runner system, the nozzle and components of the nozzle make direct contact with parts of the hot runner system and parts of the mold that are colder than the nozzle and parts associated with the hot runner nozzle. These contacts cause a heat loss and this creates a non-uniform heat profile along the nozzle.

There is a need to further improve the heaters used for injection molding hot runners and meet specific challenges such as mentioned below.

The heat profile can be improved by a better design of the heater and also by providing a better clamping/connection of the nozzle heater to the nozzle.

Also the heater design may need to take into consideration the heating requirements for several applications and for several dimensions of the nozzle.

If a nozzle heater fails or its performance is not acceptable there is a need to replace the heater with minimum effort and in a record time from the front of the nozzle.

All of these also requires that the heater should be easier to manufacture and within acceptable tolerances.

There is also a need to develop a manufacturing process for nozzle heater assemblies that use less raw materials and simpler and fewer manufacturing steps that all together reduce the energy consumption significantly.

SUMMARY OF THE INVENTION

The following summary of the present invention is provided to facilitate an understanding of some of the innovative features unique to the present invention and is not intended to be a full description. A full appreciation of the various aspects of the invention can be gained by taking the entire specification, claims, drawings, and abstract as a whole.

One non-limiting solution for the above indicated objectives is given by the teaching of the independent claims. Further embodiments of the invention are, e.g., subject of the dependent claims.

A nozzle heater assembly for hot runner nozzles according to this invention is composed of a single heating element and several sections or segments that together form a heater sleeve or tube. The heating element is coupled to the segmented heater sleeve.

In a first embodiment a nozzle heater assembly to be coupled to a hot runner nozzle, comprises a heater support made of at least two adjacent support segments spaced apart by at least one first gap and a heater element secured to the at least two support segments whereby the heater element is configured to limit the at least one first gap between the at least two segments and whereby the heater element makes indirect contact with the hot runner nozzle via nozzle sleeve segments.

In a further embodiment a nozzle heater assembly to be coupled to a hot runner nozzle comprises a heater support formed of a single piece, the heater support being configured as a hollow helical tube including at least two axial gaps and a heater element secured to the helical tube, whereby the helical tube can be axially compressed or stretched to alter a clamping force generated when the helical tube and the heater are coupled to the hot runner nozzle.

In particular, the heater sleeve or tube is made of a single support element and the single support element is shaped as a coil or a helical tube that is able to surround the nozzle body from a tip portion up to a head portion of the nozzle. In this design the axial gaps or the axial separations between the portions of the coiled or helical sleeve or tube create a multi-segment heater sleeve. The sleeve segments are configured to be movable axially relative to each other when the heater sleeve is arranged/coupled to the nozzle body. This allows for an easier installation of the nozzle heater onto the nozzle body. This further allows for an easier manufacturing and servicing of the nozzle. Furthermore, this allows for a better clamping and heat transfer from the nozzle heater to the nozzle body.

In one embodiment a heater element is attached to the inner surface of the helical or coiled sleeve.

In another embodiment the heater element is attached to the outer surface of the helical or coiled sleeve. Here, the heater element goes fully around and is helical over the full diameter of the nozzle and goes over the gaps of the segments or the gaps between the heater segments, in particular over longitudinal or transversal gaps.

In the above mentioned embodiments the sleeve segments may be fully enclosed cylindrical elements or they may include an in particular end-to-end axial elongated slot or gap that creates an open cylindrical element. Such a slot or gap creates a flexible sleeve segmented that can be easier attached or removed from the nozzle for installation and service requirements. Furthermore the slot or gap allows the heater sleeves to be clamped and generate a clamp force in both cold (i.e. room temperature), or hot (operation) conditions.

In another embodiment a heater assembly to be coupled to a hot runner nozzle comprises a heater support made of a first support segment and a second support segment, the second support segment is arranged adjacent and spaced apart by a first gap with respect to the first support segment and a heater element secured to the first support segment and secured to the second support segment whereby the heater element is configured to mechanically connect the first support segment and the second support segment and whereby the heater element makes indirect contact with the hot runner nozzle.

In a further embodiment a nozzle heater assembly to be coupled to a hot runner nozzle comprises a heater support made of at least two adjacent support segments spaced apart by at least one first gap and a heater element secured to the at least two support segments whereby the heater element is configured to limit the at least one first gap between the at least two segments and whereby the heater element makes indirect contact with the hot runner nozzle.

The heater element is attached to the heater segments in a way that the heat from the heater element is transferred only via the segments to the nozzle. Thus, the heater element only makes indirect contact with the hot runner nozzle. The advantage of this design is that the heat will be distributed within the segments before it is transferred to the surface of the nozzle and thus result in a more balanced distribution of the transferred heat.

In another embodiment a least one third support segment is located between the first support segment and the second support segment, wherein the third support segment is retaining a portion of the heater element.

In a further embodiment the first gap between the first support segment or the second support segment and a third support segment is parallel to at least one second gap between the first support segment or the second support segment and a third support segment or parallel to at least one second gap between two third support segments.

In a further embodiment, at least one support segment is made up of two semi-cylindrical elements that form a cylindrical support segment.

In a further embodiment, the first semi-cylindrical element and the second semi-cylindrical element together form a cylindrical support segment when they are mechanically connected via the heater element.

In particular, the heater sleeve or tube is made of several sleeves or tubes and a single heater element is attached or coupled to each and all of these sleeves. These sleeves form heater sleeve segments that are configured to be made of the same material or different materials. These materials have different thermal conductivities and the selection of material will impact the heat profile of the heater. The segments may have the same length, different lengths, same thickness or different thicknesses. Also it is possible that from one nozzle to the next used in the same hot runner system, each segment to be different with respect to a segment from the other nozzle. The segments may have also different other features that are used to either reduce or increase the amount of heat transferred from the heater to the nozzle body and to the melt flowing through the nozzle. The segments of each heater are in some instances movable axially relative to each other when the heater sleeve is arranged/coupled to the nozzle body in order to accommodate nozzles of different lengths. Furthermore some segments can be stored as standard components and used in conjunction with other segments that are adapted in function to some customized requests.

In another embodiment of the nozzle heater assembly the heater sleeve or tube is made of two semicircular or semi cylindrical segments that together form an enclosed circular or cylindrical element when placed on the nozzle and a heater element connects the two segments to secure and clamp the heater onto the nozzle. The semi cylindrical segments can be made by cutting a cylinder along its axis or by bending a flat surface.

In another embodiment of the nozzle heater assembly the heater sleeve or tube is made of several sleeves or tubes that are each made of two semi-cylindrical sub-segments (as mentioned in the previous paragraph) and they are all secured as a heater element by an external heater element that helps to create a clamp force onto the nozzle heater.

In another embodiment of the nozzle heater assembly the heater element is U-shaped. In particular, the heater element is U-shaped and includes two heater branches embedded in longitudinal grooves.

In another embodiment of the nozzle heater assembly the gaps between the segments are arranged transversal and/or the gaps between the segments are arranged longitudinal.

In another embodiment of the nozzle heater assembly the segments are made of different materials and/or are made of materials having a different thermal conductivity.

In another embodiment of the nozzle heater assembly the heater element goes fully around and is helical over the full diameter of the heater support and crosses the longitudinal grooves.

In all the above mentioned heater styles or designs, the heater sleeve or tube is made of at least two segments that are separated by an axial or longitudinal gap, even though they can be made of one single piece and formed accordingly. In particular the manufacture of such heater sleeves uses less raw materials and simpler and fewer manufacturing steps are required, which reduces the energy consumption for manufacturing significantly. In all of these embodiments there is a single heater element that is coupled and secured to each segment to form a single heater unit when attached to the nozzle body. In particular, the heater element goes fully around and is helical over the full diameter of the nozzle and goes over the gaps of the segments or the gaps between the heater segments, in particular over longitudinal or transversal gaps. The heater element is attached to the heater sleeve or tube in such a manner, that when mounting the nozzle heater assembly to the nozzle, the heating element limits at least one gap of a support segment or between adjacent support segments. Thereby the inner diameter of the segment(s) is reduced which results in a better clamping and connection between the nozzle heater assembly and the nozzle. This design is also advantageous for the disassembly of the nozzle heater from the nozzle: by removing the heater element from the heater sleeve or tube, the narrowed gaps expand and facilitate the removal of the sleeve or tube from the nozzle.

A solution for above indicated objectives is also given by the inventive methods of manufacturing a nozzle heater assembly. Further embodiments of the methods are, e.g., subject of the dependent claims.

A first method of manufacturing a nozzle heater assembly for an injection molding nozzle comprises the following steps:
  providing two flat substrates;
  stamping the two substrates to form two semi-cylindrical components or segments of equal curvature, wherein each segment has an inner surface and an outer surface;
  forming a series of grooves on the outer surface of the two semi-cylindrical components or segments;
  placing the two semi-cylindrical components or segments side by side with the inner surfaces facing each other;
  pressing a heater element into the grooves to secure the two segments as a single unit and provide two longitudinal gaps between the two segments.

Another embodiment of the above method further comprises the step of swaging the heater element onto the grooves, a further preferred embodiment of the method further comprises the step of providing a cylindrical cover over the two segments and swaging the cylindrical cover over the heater element onto the grooves.

A second method of manufacturing a nozzle heater assembly for an injection molding nozzle comprises the following steps:

providing a mold or a dye having a mold or a dye cavity;
feeding a molten material into the mold or dye cavity to form a semi-cylindrical heater segment having a curved inner surface and a curved outer surface, the outer surface including a profiled groove;
cooling the molten material in the mold or dye;
extracting a solidified segment from the mold;
placing the two semi-cylindrical components or segments side by side with the inner surfaces facing each other;
pressing a heater element into the grooves to secure the two segments as a single unit and to provide two longitudinal gaps between the two segments.

Further embodiments of the above methods further comprises the step of swaging the heater element onto the grooves, a further preferred embodiment of the methods further comprises the step of providing a cylindrical cover over the two segments and swaging the cylindrical cover over the heater element onto the grooves.

Further advantages, features and possible applications of the present invention ensue from the following description in conjunction with the figures.

BRIEF DESCRIPTION OF THE DRAWINGS

FIG. 2a shows a cross section through a tip portion of a valve gated nozzle shown in FIG. 1a.

FIG. 2c shows a cross section through a head portion of the nozzle shown in FIG. 1a.

FIGS. 4a-4d show various stages of a making nozzle sleeve and a nozzle heater according to an exemplary embodiment of the invention.

FIGS. 8a-8i show a nozzle sleeve and a nozzle heater according to another exemplary embodiment of the invention.

DETAILED DESCRIPTION OF EMBODIMENTS

Figure 1A:
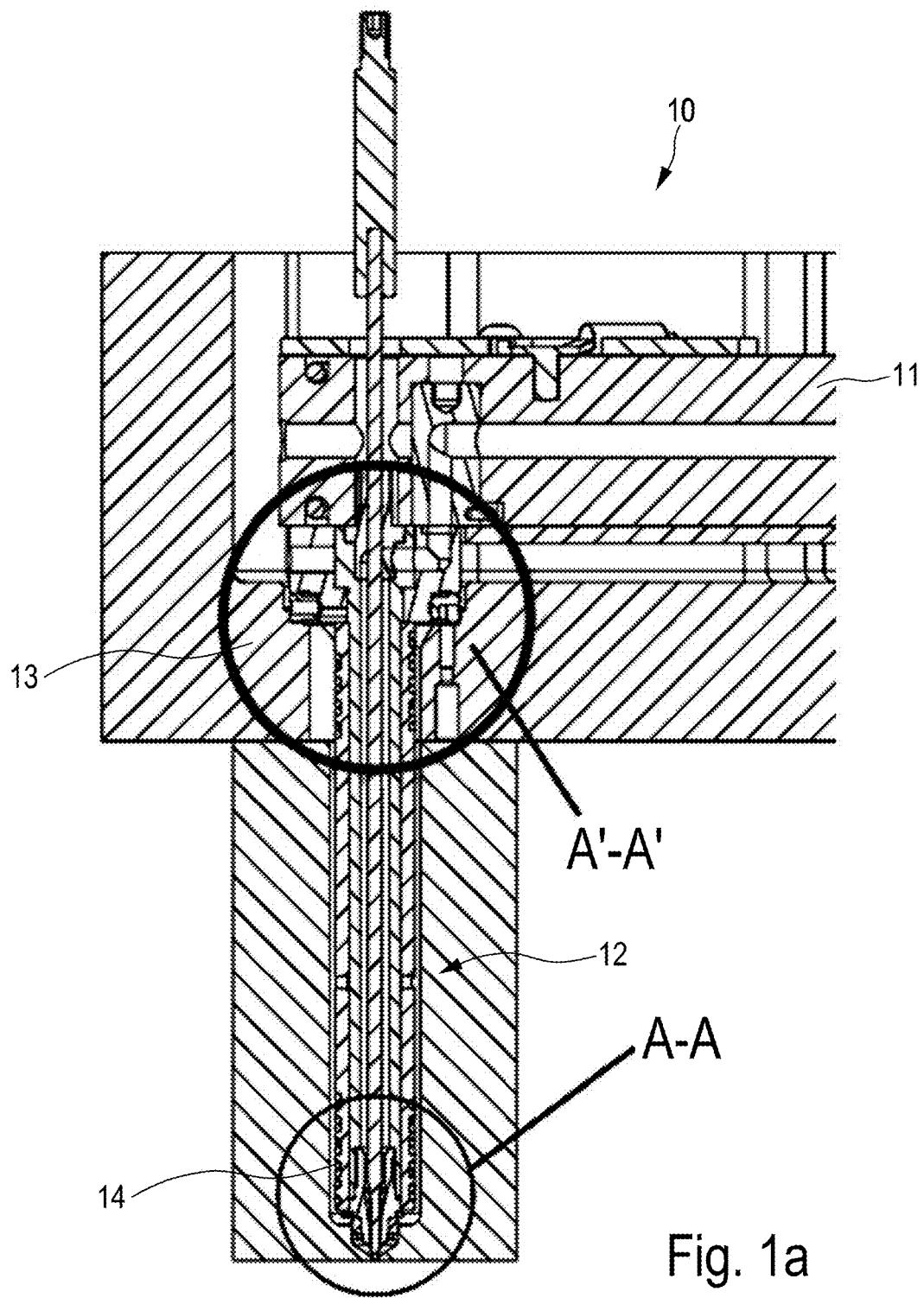
FIG. 1a shows a cross section through an exemplary hot runner system including a valve gated nozzle and a nozzle heater according to an exemplary embodiment of the invention.

Technical features described in this application can be used to construct various embodiments of nozzle heater assemblies and methods of manufacturing nozzle heater assemblies for an injection molding nozzle.

Reference will now be made to the drawings, in which the various elements of embodiments will be given numerical designations and in which embodiments will be discussed so as to enable one skilled in the art to make and use the invention.

Specific reference to components, process steps, and other elements are not intended to be limiting. Further, it is understood that like parts bear the same reference numerals, when referring to alternate figures. It will be further noted that the figures are schematic, are provided for guidance to the skilled reader, and are not necessarily drawn to scale. Rather, the various drawing scales, aspect ratios, and numbers of components shown in the figures may be purposely distorted to make certain features or relationships easier to understand.

FIG. 1a shows a hot runner system 10, a valve gated nozzle 12 and an improved nozzle heater 14 according to an exemplary embodiment of the invention. As known area A'-A' indicates the potential heat loss at the head portion of the nozzle due to contact with colder parts adjacent the manifold, such as mold plate 13. Also as known area A-A indicates the potential heat loss at the tip portion of the nozzle due to contact with other colder parts. This A-A area is also close to a gate area of a mold cavity (not shown) where access of a molten material delivered through a manifold 11 and nozzle 12 is controlled by the movement of valve pin 28.

Figure 1B:
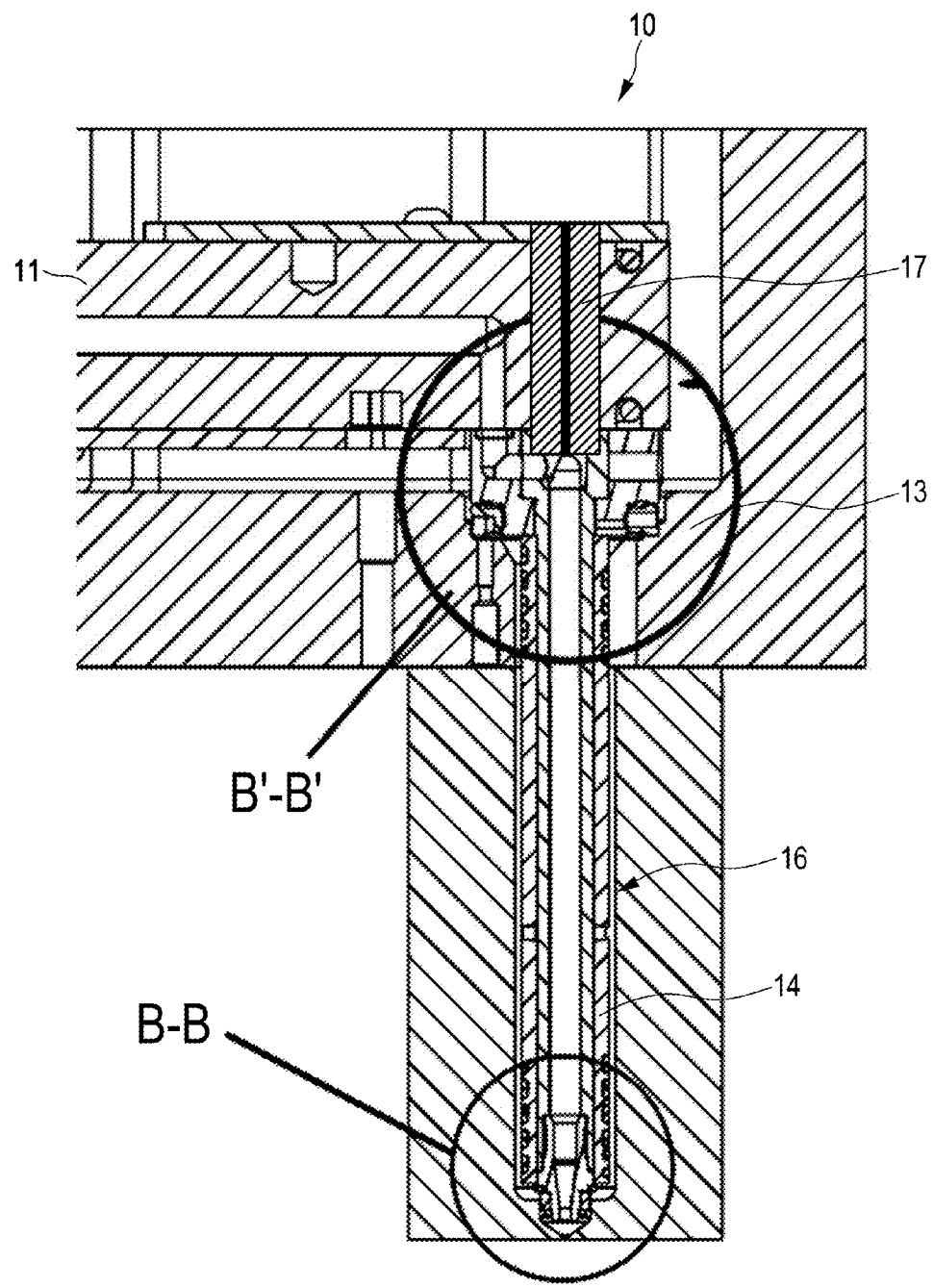
FIG. 1b shows a cross section through an exemplary hot runner system including an open gate nozzle and a nozzle heater according to an exemplary embodiment of the invention.

FIG. 1b shows the hot runner system 10 and an open gate nozzle 16 and the nozzle heater 14 according to an exemplary embodiment of the invention where the area B'-B' indicates the potential heat loss at the head portion of the nozzle due to contact with colder parts. Also as known area B-B indicates the potential heat loss at the tip portion of the nozzle due to contact with other colder parts. This B-B area is also close to a gate area of a mold cavity (not shown) where access of a molten material delivered through a manifold 11 and nozzle 12 is controlled by the cooling channels 15. In the embodiment of FIG. 1b a thermocouple 17 or similar temperature sensor is coupled to the manifold to measure the temperature of a molten material as it exits the manifold and enters the nozzle melt channel. This helps to fine tune the heating power of the nozzle heater considering that this is an open gate design that is harder to control at the gate.

Figure 2A:
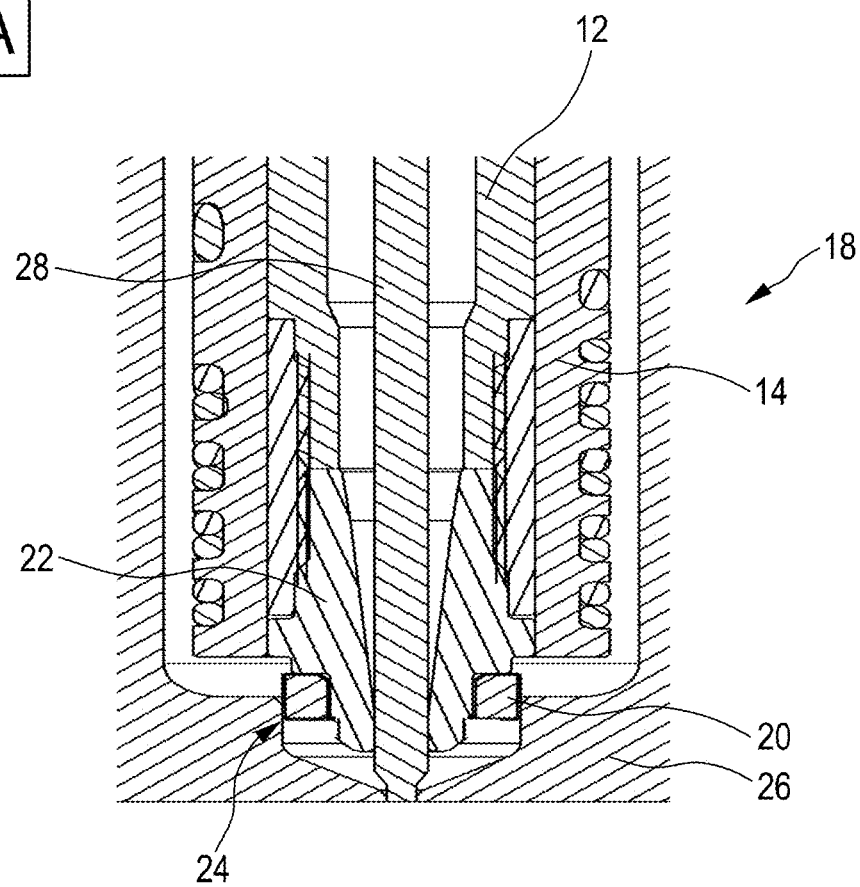

FIG. 2a shows tip portion 18 of the valve gated nozzle 12 and a nozzle heater 14 according to an exemplary embodiment of the invention. In the nozzle tip portion 18 shown in circle A-A in FIG. 1a, there is a heat loss caused by the contact between a seal 20 of the nozzle tip 22 and the wall 24 of a mold plate 26. The heat loss creates an undesirable heat profile along the nozzle and may also create in time an accumulation of cold residual material and wear of the valve pin 28.

Figure 2B:
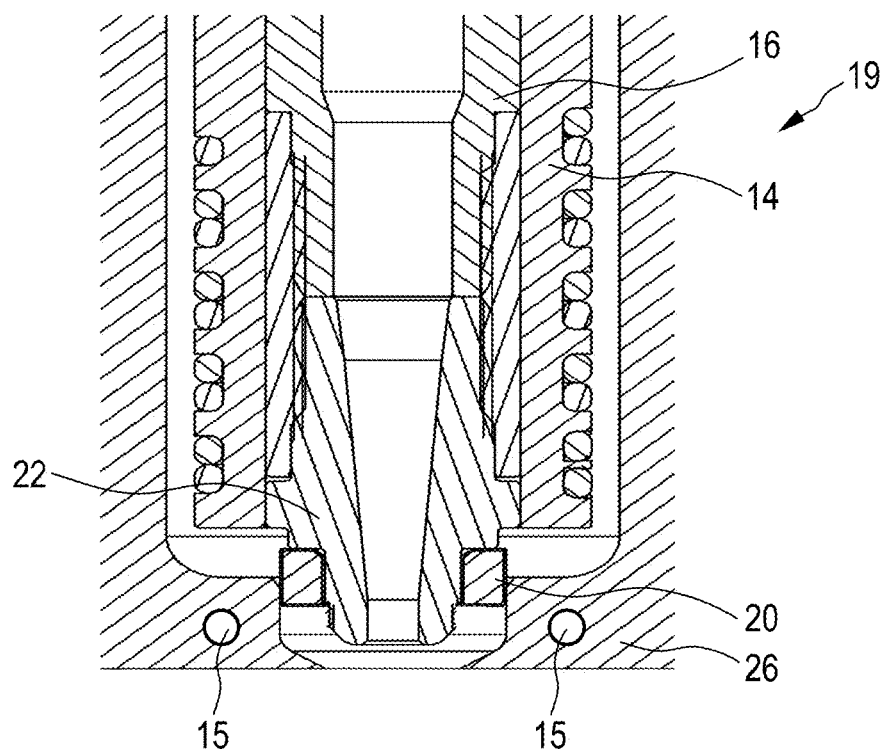
FIG. 2b shows a cross section through a tip portion of an open gate nozzle shown in FIG. 1b.

FIG. 2b shows a tip portion 19 of the open gate nozzle 16 (also known as a thermal gate) and a nozzle heater 14 according to an exemplary embodiment of the invention. In the nozzle tip portion 19 shown in circle B-B in FIG. 1b, there is a heat loss caused by the contact between an insulation seal 20 of the nozzle tip 22 and the wall 24 of a mold plate 26. The heat loss creates an undesirable heat profile along the nozzle and may also create in time an accumulation of residual material or stringing of material.

Figure 2C:
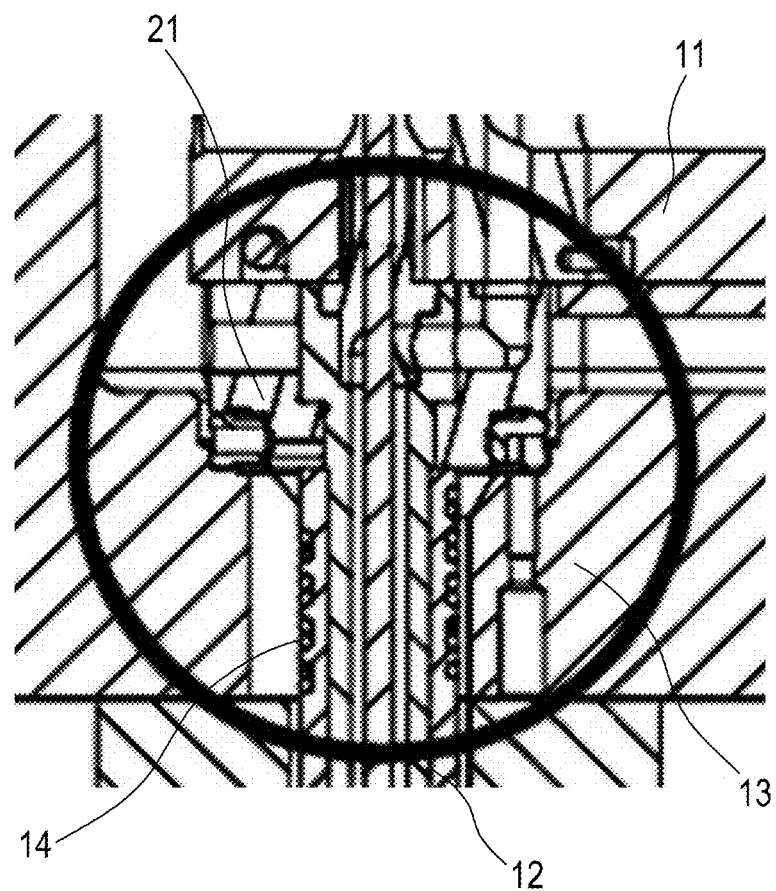

FIG. 2c shows the enlarged portion A'-A' of FIG. 1 and the area of potential heat loss at the head portion 21 of the nozzle 12 due to contact with colder mold plate 13.

In order to improve the heat profile of valve gated hot runner nozzle 12 or a thermal gate or open gate nozzle 16, heater 14 is provided according to this invention with a segmented support sleeve and a single heater element coupled to the segmented support sleeve. Exemplary embodiments are shown in various design options in FIGS. 4-9.

Figure 3:
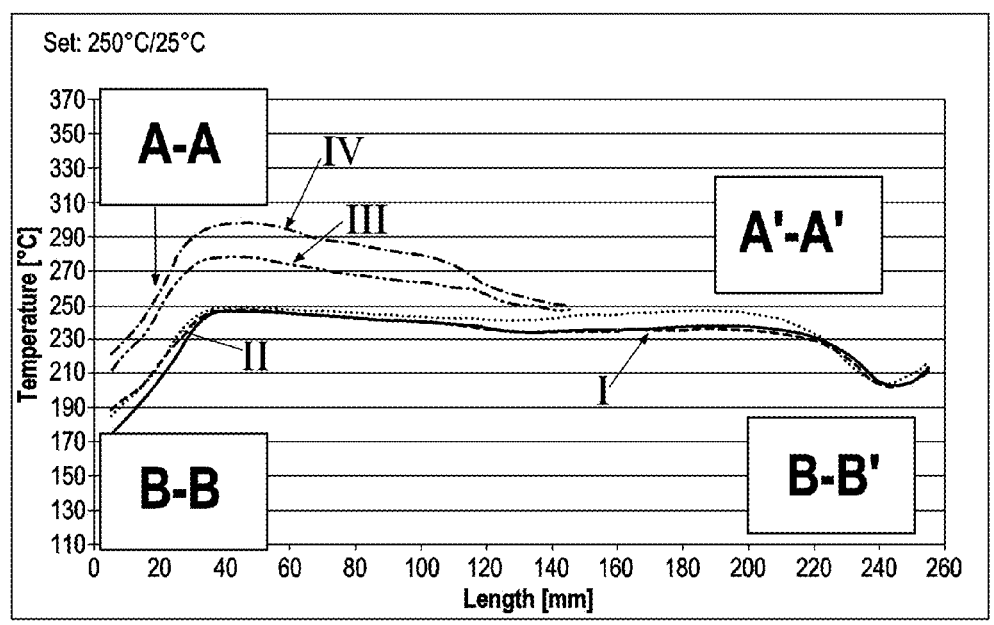
FIG. 3 shows heat profiles along an exemplary hot runner nozzle.

FIG. 3 shows just an example of the heat profile along a nozzle such as valve gated nozzle 12 or an open gate nozzle 16 using a nozzle heater 14 in its design variations according to exemplary embodiments of FIGS. 4-9 of the invention. In the first graph, portions I show the heat profile at the tip area of the same heater for two nozzle styles, the valve gate A-A and A'-A' and the open gate B-B'. The graph shows a bigger heat loss at the tip that is compensated by adding more heater element wattage at the tip or improving the clamp force at the tip. Graphs II, III, IV show changes in the heat profile at the nozzle tip portions by variations of the wattage of the heater and changes in the clamp force.

FIGS. 4a-4d, FIGS. 5a-5c, FIGS. 6a-6c and FIGS. 7a-7b show various embodiments of a nozzle heater 14 shown in FIGS. 1 and 2 as being coupled to nozzle 12 and nozzle 16.

Figure 4C:
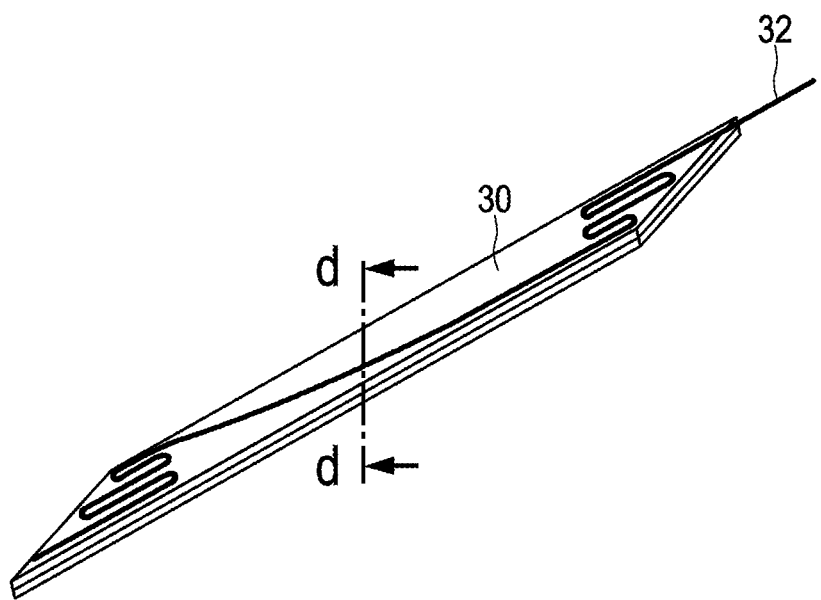
Figure 4D:
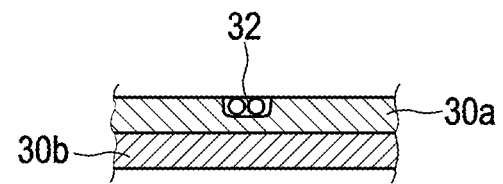
Figure 5A:
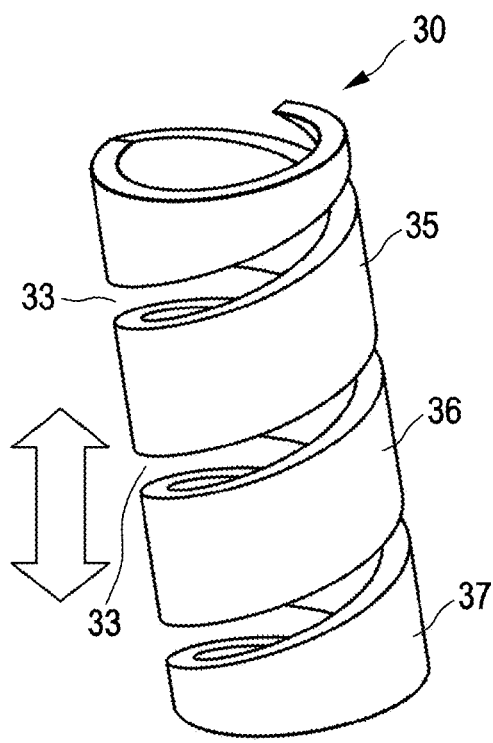
FIGS. 5a-5c show various stages of a nozzle sleeve, a nozzle heater and a nozzle thermocouple according to the embodiment of FIGS. 4a-b-c-d.
Figure 5B:
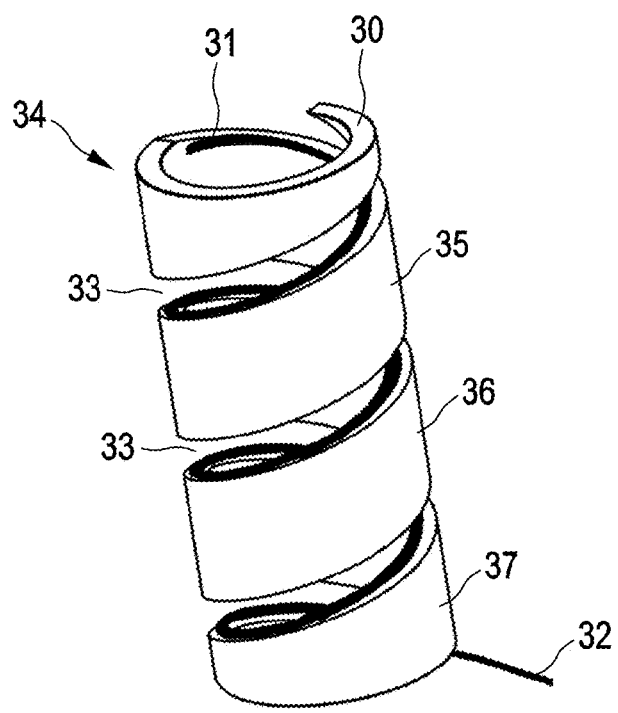
Figure 5C:
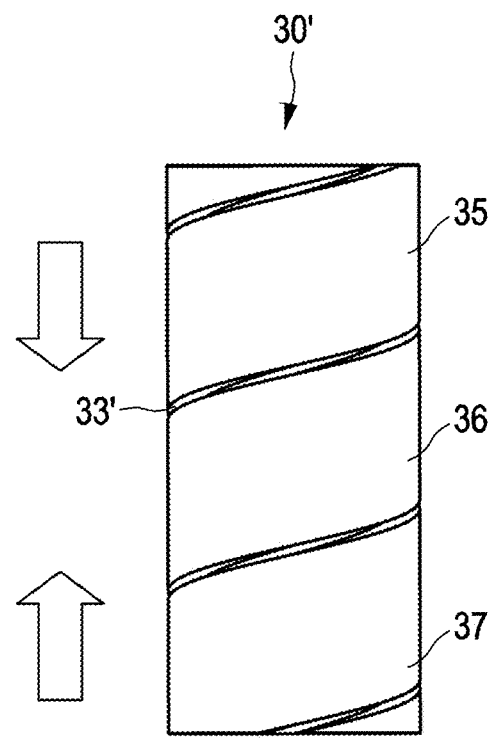

FIGS. 4 to 6 show an embodiment where a single piece support sleeve 30 or 30' and a heating element 32 or 32' coupled to the support 30-30' are twisted in the form of a helical tube that has several axial gaps 33 or 33' between consecutive sleeve segments 35-36-37 or 35'-36'-37'. The gaps and the segments are designed to allow the heater to have a self-clamping force feature when it slides onto the body of a nozzle and is secured onto the nozzle body and then fixed into a permanent operating position. By reducing the size of gaps 33 in particularly through an axial movement of the segments, the heater can be removed from the nozzle body very easy as the inner diameter of the helical tube is slightly enlarged. On the other hand by increasing the gaps, or by stretching the helical tube, the heater tube will have a slightly reduced inner diameter and that will increase the clamping force. The support sleeve 30 allows for a better heat distribution form the heating element 32 to the nozzle body, compared to a situation where the heating element 32 is coupled directly to the nozzle body, as known in the art. In FIGS. 5a-5c the helical tube support 30 is in a stretched position that generates the clamp force that can be slightly changed via more or less axial expansion/stretching. In FIG. 5c the heater support sleeve 30' is shown in a compressed situation that reduces gap 33' and allows for an easier removal of the heater off the nozzle.

The nozzle sleeve 30 and a nozzle heater element 32 are thus forming a heater assembly 34 according to a first embodiment.

In FIG. 4a a first manufacturing step of the heater assembly 34 is shown. A flat or planar or sheet like heater element support 30 is first selected and prepared of a thermally conductive material that can be coiled or turned into a helical tube like sleeve without damaging its mechanical properties. A heater element 32 including an insulating cover is coupled, connected or attached to the support 30 using known methods such as welding or bonding. Also a heater element 32' can be attached via pressing into a helical groove made on the support 30' and shown in more detail in FIGS. 7a-b. In this case the heater element 32 and the heater support 30 form the novel nozzle heater 34.

As shown in FIG. 4d, the flat or planar or sheet like heater element support 30 can be composed of multiple materials, in FIG. 4d exemplary two layers are shown. In this exemplary embodiment, a first material 30a is copper and a second material 30b is steel. As the thermal expansion of copper is higher than the thermal expansion of steel, the connection between the heater tube or sleeve and the hot runner nozzle will not be affected with increasing temperature during operation of the injection molding machine. A heater element 32 is embedded in a groove within the copper layer for increasing the heat transfer between the heater element 32 and the heater sleeve or tube 30.

Figure 6A:
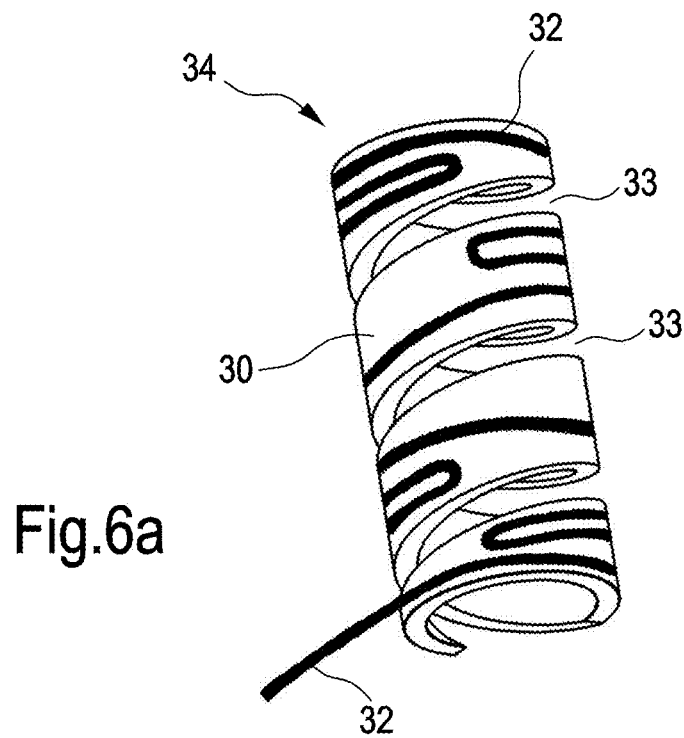
FIGS. 6a-6c show a nozzle, a nozzle heater and a nozzle thermocouple according to an exemplary embodiment of the invention and in relation to FIGS. 4-5-6.
Figure 6B:
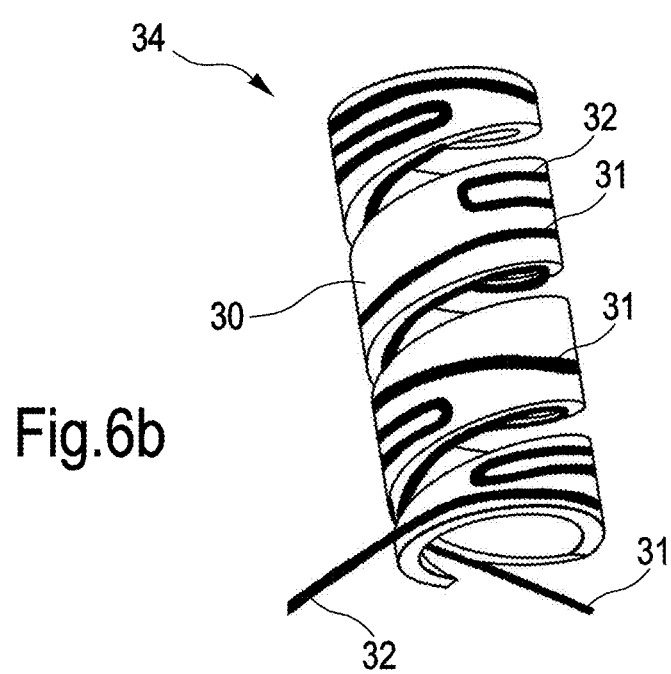

As shown in FIGS. 5a-5c the support 30 can be coiled in cold or warm conditions having the heater element either on the interior or the exterior side of the support as seen in FIG. 5a. If the heater element is on the inner side it may make a better contact with a nozzle body. The heat profile and heat transfer is also good when the heater element 32 is positioned on the outer surface of the support 30, as shown in FIGS. 6a-6c.

Figure 6C:
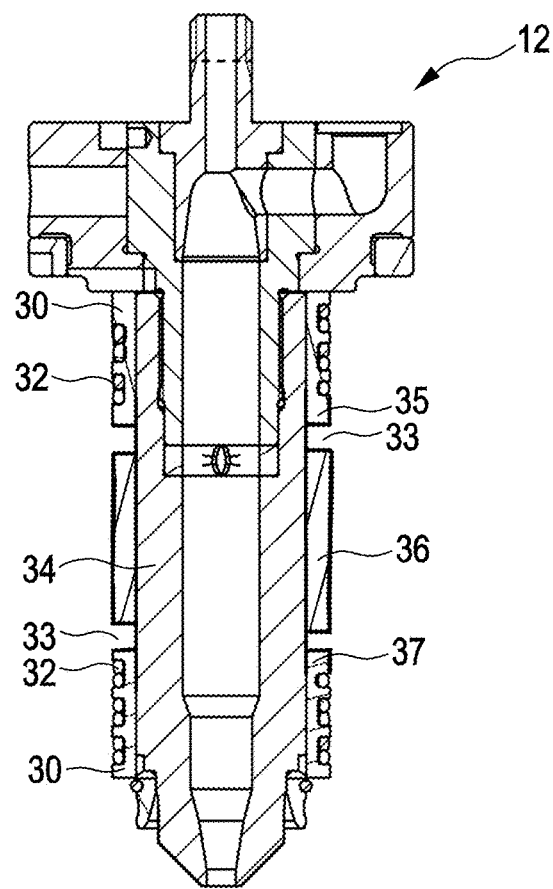

Because the heater element support 30 is coiled, several heater elements segments 35-36-37 can be defined along an axis of the nozzle heater 34 and along the hot runner nozzle 12 shown in FIG. 6c.

Because the heater element support 30 is coiled it can be manufactured easier than by turning from a bar and there is no need for tight tolerances between the inner diameter of the coiled heater and the outer diameter of the nozzle. Furthermore, the coiled or helical shape allows for a better clamping of the heater element 34 onto the nozzle 40. Also, the helical structure and the sleeve segments defined by the helical shape allows these segments to be axially moved along the nozzle to locate each segment in a desired position along the nozzle.

As shown in FIG. 5a-5c, the coiled or helical sleeve that also forms a tube, can have a spacing between each segment that can be increased or reduced as indicated by the arrows. The clamping force is bigger when the helical sleeve is in the extended position of FIG. 5a and the clamping force is smaller when the helical sleeve is collapsed as shown in FIG. 5c and this reduces the heat transfer. The helical sleeve can also include slots or openings in the middle section to reduce the heat transfer in the middle section of the nozzles and improve the heat profile as shown in the chart of FIG. 3. In order to further or separately improve the heat profile along the nozzle and increase the heat transfer at the ends of the nozzle, at the tip portion and or the head portion, the heater shown in FIGS. 4a-4d can have a heater element designed to have more wirings and thus more power and heat at the ends of the heater. In FIG. 5b a thermocouple element 31 is shown as being located on the spiral created by the helical support sleeve having a measurement head located at one end of the support.

Figure 7A:
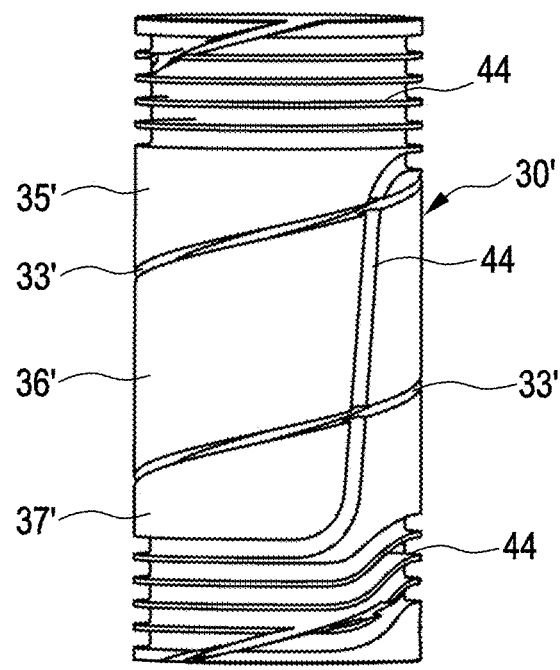
FIGS. 7a-7b show a nozzle sleeve and a nozzle heater according to an exemplary embodiment of the invention and in relation to FIGS. 4-5-6.
Figure 7B:
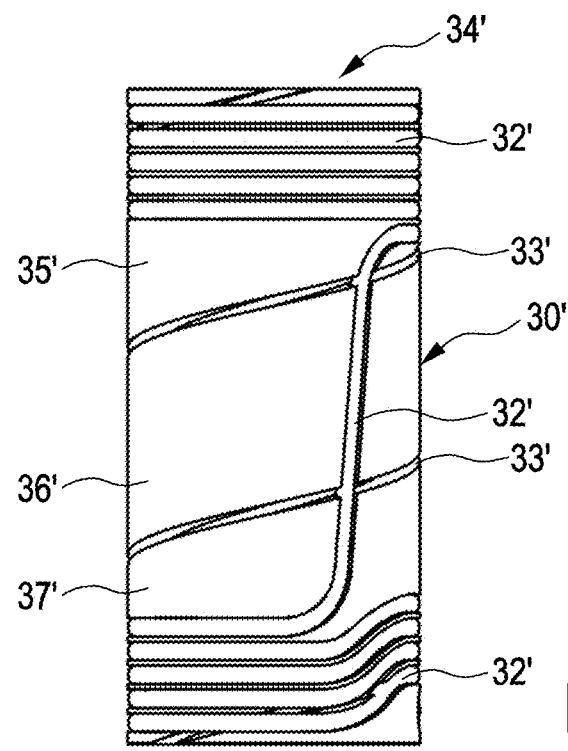

In another exemplary embodiment of the invention shown in FIGS. 7a-7b, the coiled or helical sleeve 30' includes a helical groove 44 or grooves. In FIG. 7a, there is no heater element in the groove 44, in FIG. 7b a heater element 32' is pressed into the grooves 44. In these embodiments gaps 33' are minimum to allow the heater 34' be removed or coupled to the nozzle body.

Figure 8A:
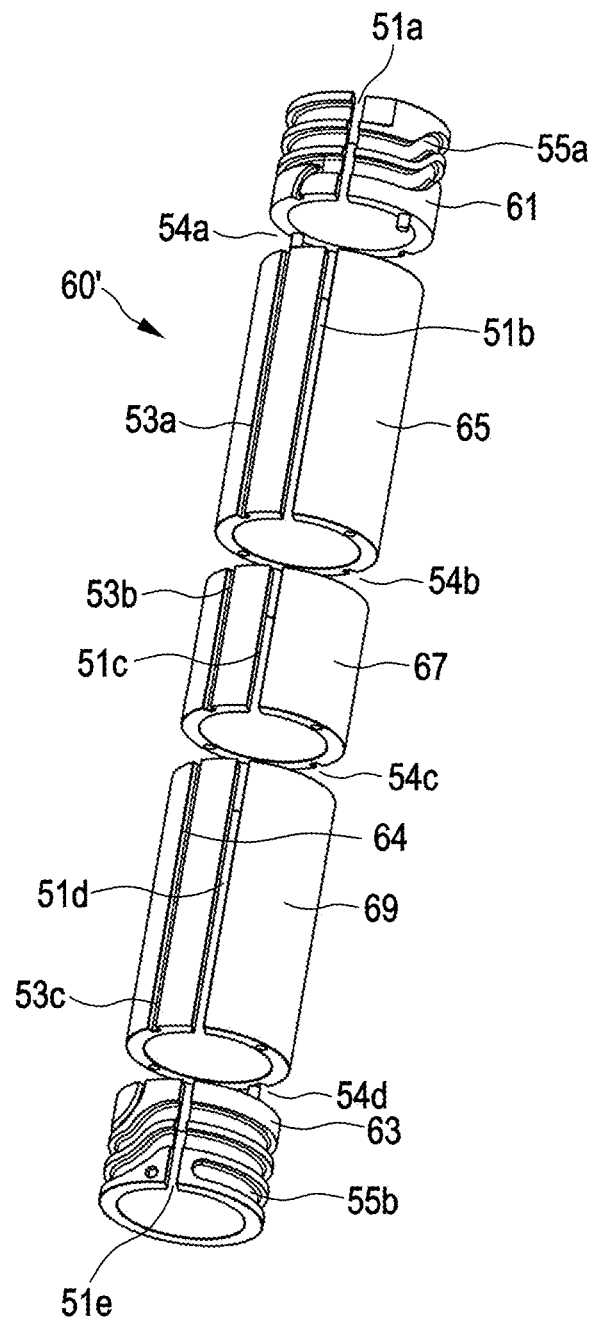
Figure 8B:
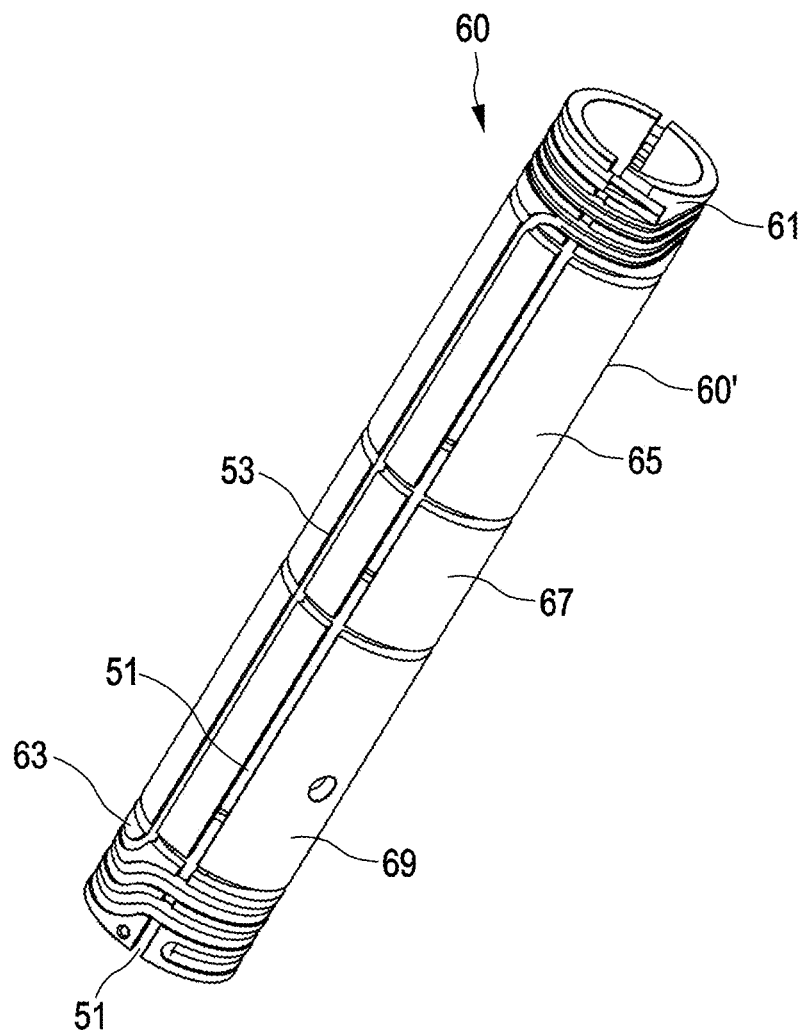
Figure 8C:
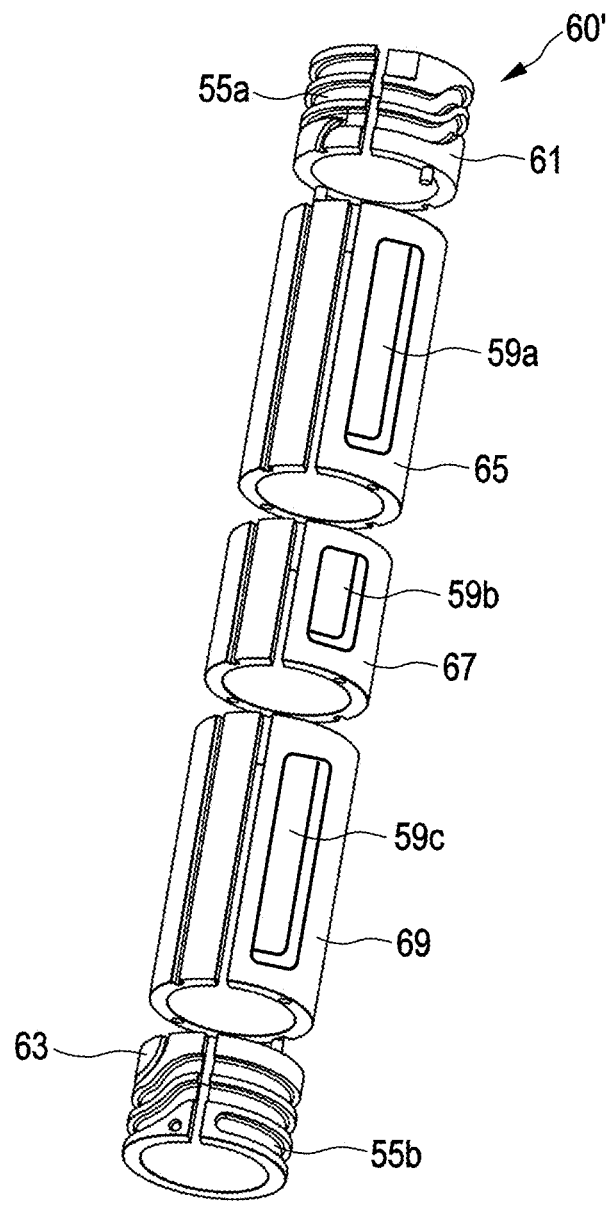

In the embodiment of FIGS. 8a-8c another style or design of a multi segment heater sleeve 60 and 60' is shown, to be used for examples with hot runner nozzles 12 or 14. Heater sleeve 60 or 60' is made of several sleeve segments, such as for example five segments 61, 63, 65, 67, 69 that define a the modular heater element sleeve 60. The segments 61, 63, 65, 67, 69 can be relatively moved axially relative to each other before installing them along the nozzle body 34 of nozzle 12 shown in FIG. 6c to provide a desired heat profile and to accommodate a range of nozzle lengths. These segments 61, 63, 65, 67, 69 shown in FIG. 8a can be made of different materials having different thermal conductivities, a different length and for some applications having a different thickness. For example segments 61 and 63 of FIG. 8a can be made of the same high thermally conductive material including Copper, Beryllium Copper, Aluminum and known alloys of these materials. These ensure that areas of the nozzles in FIGS. 1a and 1b that have a higher heat loss get more heat energy from the heater sleeve 60 or 60'. In these embodiments the heater segments for example 65, 67, 69 can be made of less thermally conductive materials such as H13 metals. These intermediate segments 65, 67, 69 can also be made of thermally insulative material such as ceramics of various properties. Such ceramic materials will further reduce the heat transfer from the heater to the nozzle. In these embodiments of FIG. 8, the end segments 61 and 63 include helical groves 55a and 55b that are used to receive a single heater element 32 pressed into the helical grooves.

The heater element 32 is also pressed into a longitudinal groove 53 consisting of groove segments 53a, 53b, 53c. This intermediate portion of the heater element has a minimum length in the segments 65, 67 and 69 to reduce the amount of heat in these middle sections of the nozzle heater. A longitudinal slot 51 formed of segment slots 51a, 51b, 51c, 51d and 51e is machined to create a slightly flexible sleeve to facilitate the removal of each segment from the nozzle. Transversal gaps 54a, 54b, 54c and 54d that are perpendicular to an axis of the sleeve 60' define a space between these segments and they have both a manufacturing function and an operational-performance function. These gaps can have a minimum size where the heater segments touch or almost touch each other or they may be formed to create distances that allow the segments to be more spread and cover nozzles of various lengths and/or interrupt the heat transfer from segment to segment.

In another exemplary embodiment of the invention, not shown, only three segments such as for example segments 61, 67 and 63 can be used for smaller nozzles, the middle segment 67 being similar to the middle segment 67 shown in FIGS. 8a-8c. To further reduce the heat transfer, FIG. 8c shows additional elongated grooves 59a, 59b and 59c being formed in the middle sections.

As further seen in FIGS. 8d-8i the heater element 32 has a resistance wire 50 enclosed in a refractory powder electrical insulating material 49 such as magnesium oxide powder in an outer steel casing 48. The resistance wire 50 has a helical path that allows for a longer element to be enclosed in the steel casing 48 to provide a higher heating power. Heating element 32 is press fitted into helical grooves 55a, 55b located on an outer surface of the first support segment 61 and of second support segment 63. An intermediate portion of the heater element 32 is also pressed into a longitudinal groove 53 consisting of several groove segments 53a, 53b, 53c. By doing this, the heating element is fully secured to the sleeve 60' in a good thermal contact position.

Figure 8D:
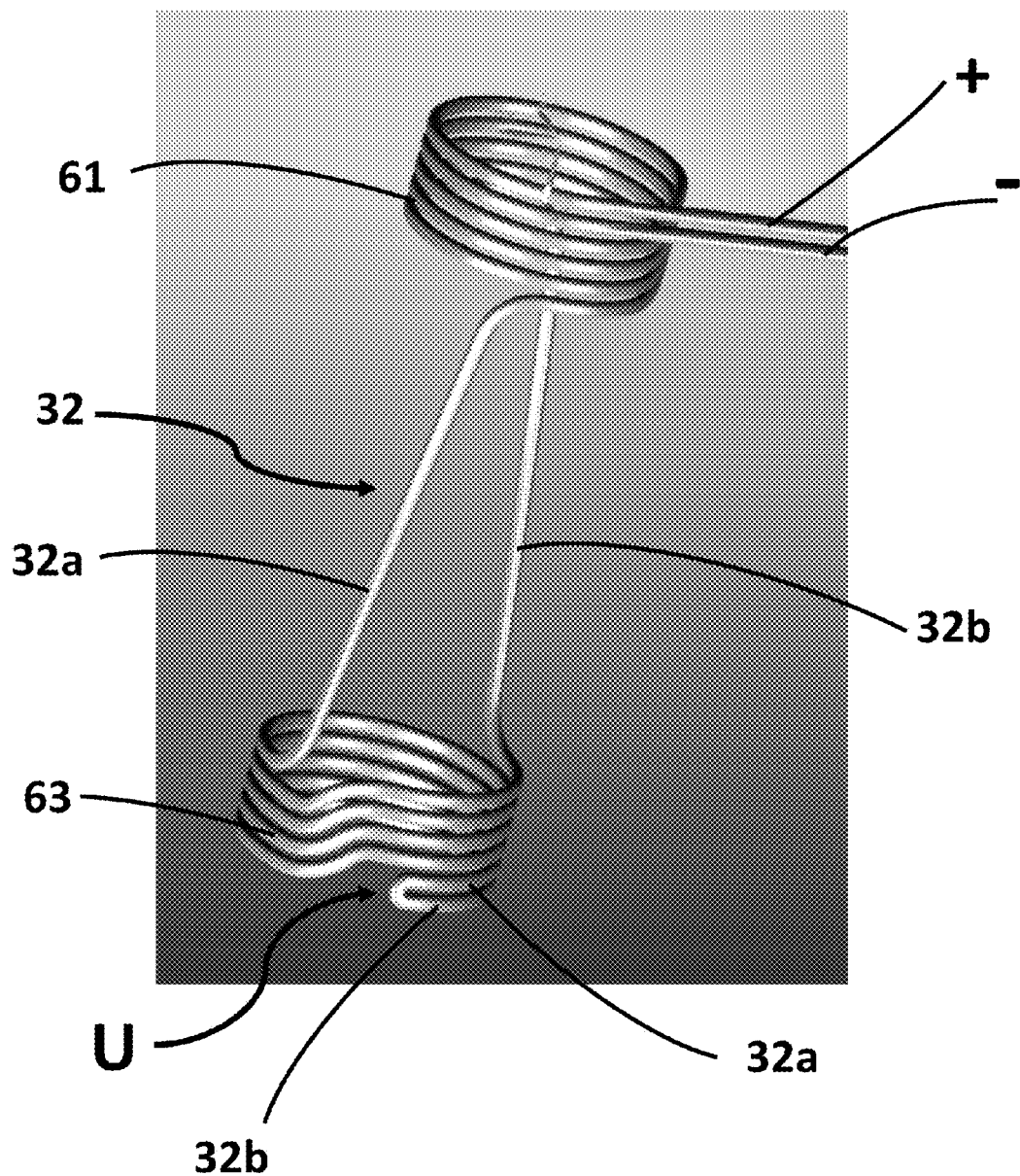
Figure 8I:
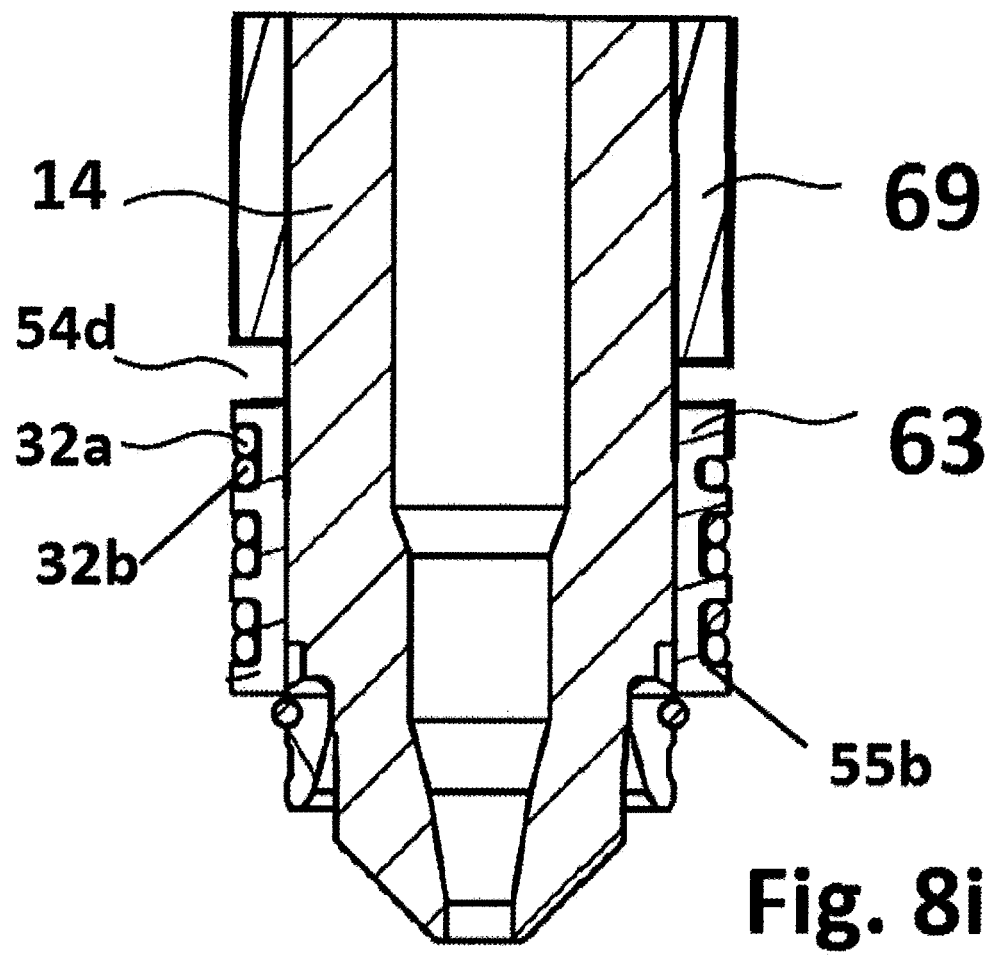

As shown in FIG. 8d two branches 32a and 32b of the heater element 32 are created by using a U-shaped heating element and this allows to bring terminals + and − at the end portion 61 of heater assembly 60 and heater sleeve 60'. The first branch 32a is pressed in grooves 53a, 53b, 53c and the second branch 32b is placed on corresponding grooves 53a, 53b, 53c situated on the other side of heater assembly 60 and heater sleeve 60' (not shown). Placing only two straight branches 32a and 32b of heater 32 in the middle section that are also embedded in grooves provides both mechanical stability and a limited heat transfer that is less than in extreme sections 61 and 63. Also the middle section will have a more uniform heat dissipation via segment bodies 65, 67, 69 including the embedded branches 32a and 32b compared to the situation where the heater element branches 32a and 32b making direct contact with the nozzle body 34 shown in FIG. 8i.

Figure 9A:
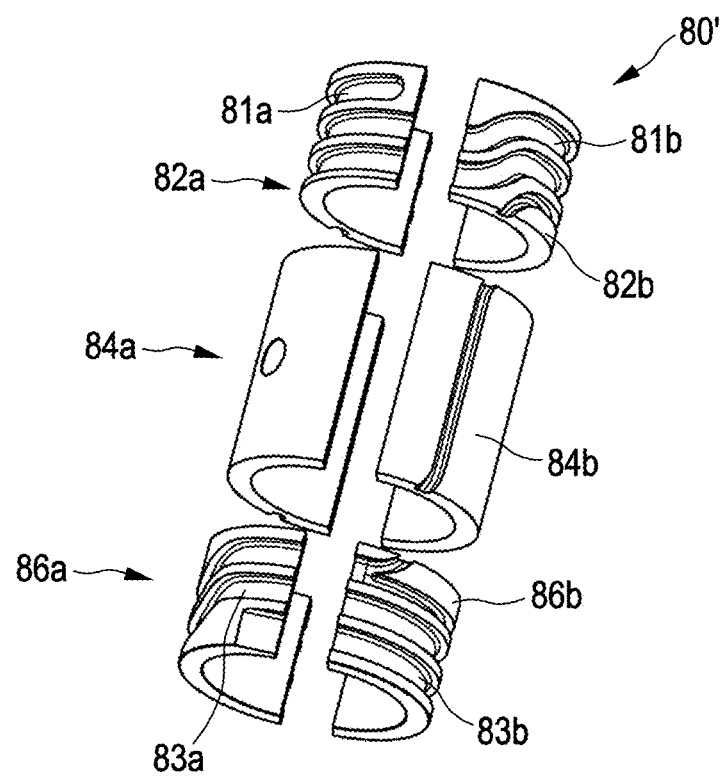
FIGS. 9a-9f show a nozzle sleeve and a nozzle heater according to another exemplary embodiment of the invention.

Heater element 32 shown in the embodiments of FIGS. 8d, 8e, 8g, 8f, 8h can be used with the nozzle heaters and heater sleeves shown in FIGS. 7a-b, FIGS. 8a-b-c, FIGS. 9a'-b-c-d-e-f.

Heater element 32 shown in FIG. 8h can be used in the embodiments of FIG. 4c-d and FIG. 6a with or without the U shape configuration.

FIGS. 9a-9d show a nozzle sleeve and a nozzle heater assembly 80 according to another exemplary embodiment of the invention.

Figure 9B:
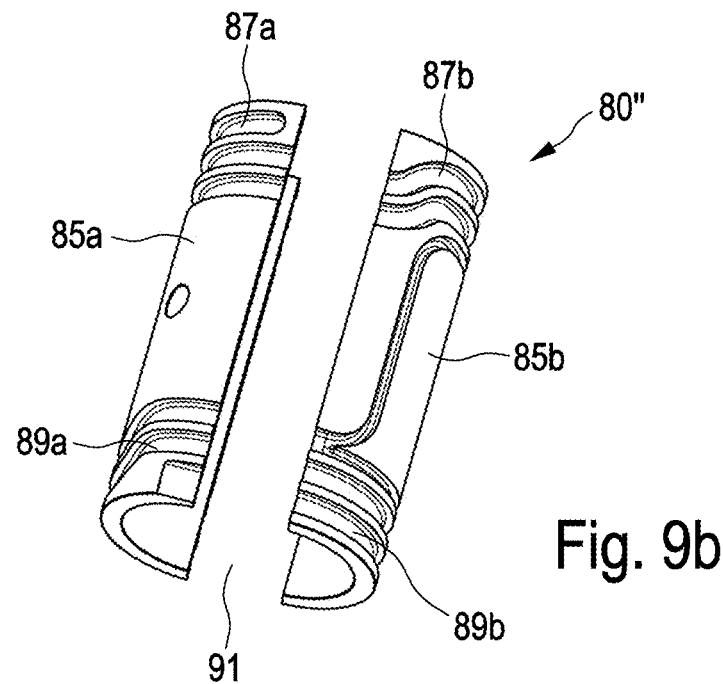
Figure 9C:
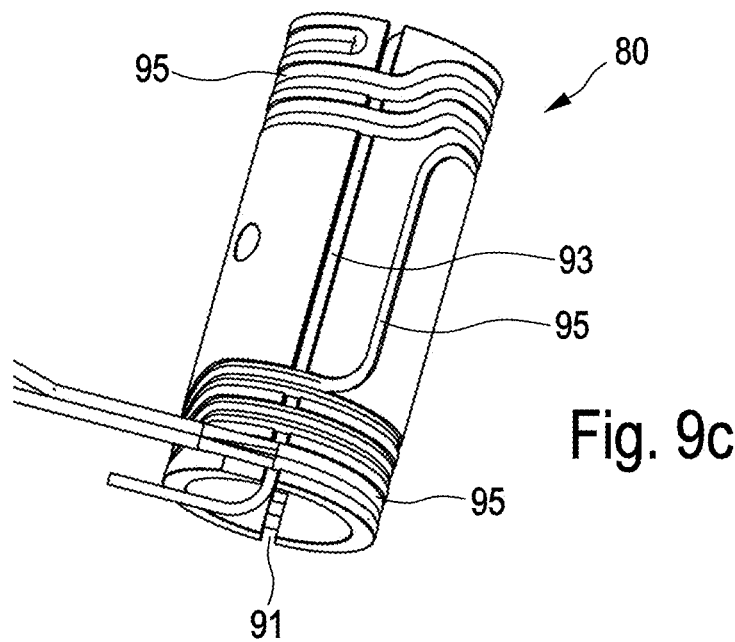

In the exemplary embodiments of the invention shown in FIGS. 9b and 9c, the heater sleeve or tube 80" is made of two semicircular or semi cylindrical segments 85a and 85b that together form an enclosed circular or cylindrical element 80 when placed on the nozzle shown in FIGS. 1 and 2. A heater element 95 connects the two segments to secure and clamp the heater onto the nozzle. The semi cylindrical segments can be made by cutting a cylinder along its axis or by bending two flat surfaces. Each segment includes upper and lower helical grooves 87a and 89a that are matched with corresponding helical grooves 87b and 89b on the other segment that completes the heater assembly 80. These segments are separated by a gap 91 that becomes two longitudinal slots 91 when the two semi-cylindrical segments 85a and 85b are coupled using heater element 95.

Figure 9D:
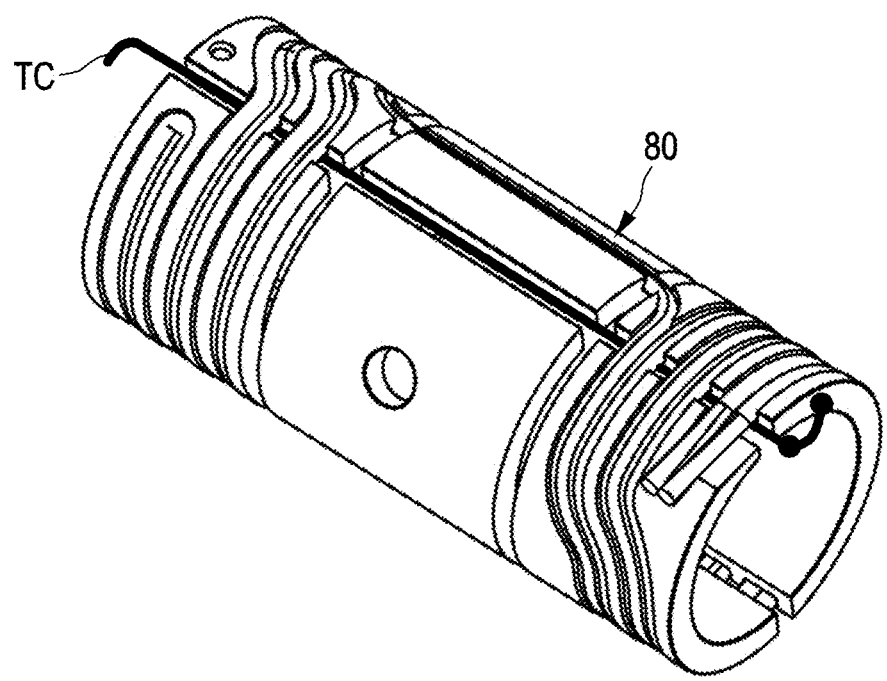
Figure 9E:
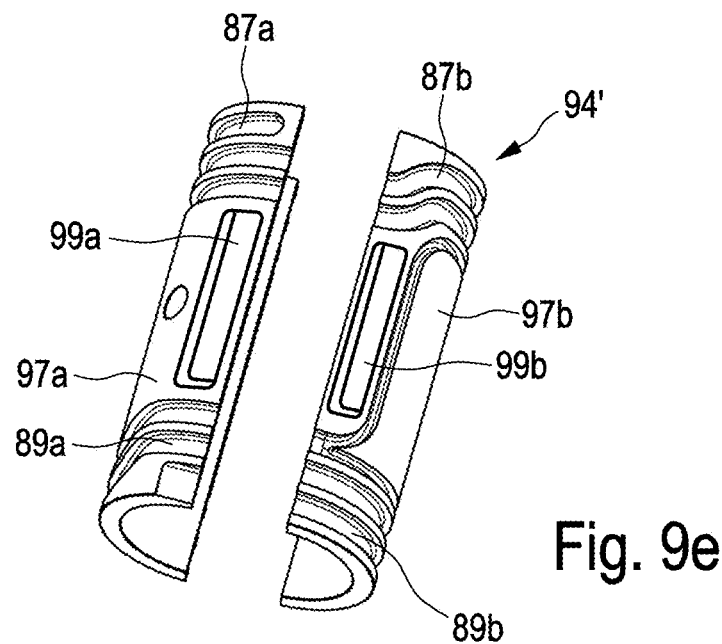
Figure 9F:
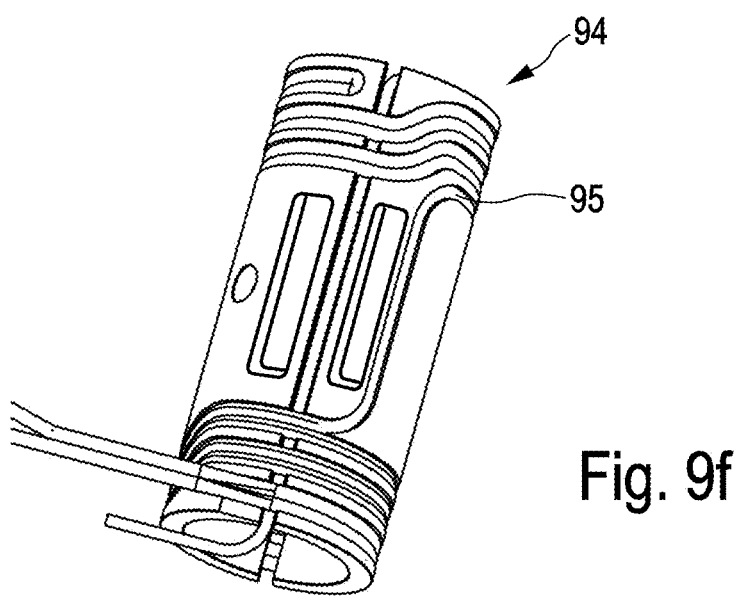

In another exemplary embodiment of the invention shown in FIG. 9a, the heater sleeve or tube 80' is similar with the heater sleeve 80, 80" shown in FIGS. 9b and 9c but it is made of several sleeves or tubes that are each made of two semi-cylindrical sub-segments (as mentioned in the previous paragraph) and they are all secured as a heater element by an external heater element that helps to create a clamp force onto the nozzle heater. This embodiment of FIG. 9a is the semi-cylindrical version of FIG. 8 a. As shown in FIG. 9d, a thermocouple TC is located in either gap 91 or 93 shown in FIG. 9c. In some embodiments two thermocouples can be used in gaps 91, 93 as a backup or two measure the temperatures at two different locations along the heater sleeve and nozzle. The gap 93 shown in FIG. 9c can also be designed as a groove 93 for accommodating a thermocouple 93.

In the embodiment of FIG. 9a the heater sleeve 80" shown in FIG. 9b-9c is further segmented in the middle via transversal gaps. A middle or intermediate sleeve made of two semi cylindrical segments 84a-84b is added between segments (81a-81b and 86a-86b). This allows the intermediate sleeves to be made of a different material (usually less thermally conductive). This design is similar to the design shown in the embodiments of FIG. 8a-8i, except that each segment shown in FIGS. 8a-8i are split to create a semi-cylindrical half. The embodiments of FIG. 9 are easier and faster to produce and the heater element 95 is used to secure and provide a clamp force of the heater to the nozzle.

In the exemplary embodiments of the invention shown in FIGS. 9a to 9f the semicircular or semi-cylindrical segments 85a and 85b of the heater sleeve 80" and the segments 82a-b, 84a-b and 86a-b of the heater sleeve 80' are manufactured according to an exemplary embodiment of the invention from a flat or planar sheet.

For example once the flat or planar sheet is selected and cut to the right dimension via a stamping process, the planar sheet is next deformed in a press that creates the semicircular or semi-cylindrical segments 85a and 85b of the heater sleeve 80" and the segments 82*a-b* 84*a-b* and 86*a-b* of the heater sleeve 80' that will match the outer surface diameter of a nozzle. In some instances in a next step the grooves 81 and 83 are further formed via a subsequent or simultaneous stamping process using a profiled stamper replicating the grooves. This step of forming the grooves via a deformation process can take place before or after or simultaneous to the stamping process that creates the semi-circular or semi-cylindrical shape of each segment.

If a large quantity of segments is needed, a production line can be set where a large sheet is first divided into multiple flat elements, the flat elements are next collected and placed into a stamper in batches, and in the next step each batch of flat elements is automatically semi-cylindrical shaped and profiled with the required grooves.

Once the segments are manufactured using these steps, the support segments are coupled or connected using the heater element 95 shown in FIGS. 9*c* and 9*d*. This is done using a special jig that simulates the nozzle body in terms of the required inner diameter of the heater assembly 80 or 80' or 80" to match each nozzle. The length of the heater element 95 is calculated in such a way to provide the required amount of heat and also to contribute to the creation of the clamping force needed to secure the heater to the nozzle in a perfect thermal contact.

The heater element is pressed into the grooves to ensure an optimum heat transfer into the segments.

In some cases the heater element is subsequently swaged into the grooves to further improve the heat transfer and also better secure the heating element.

In some other cases a thin cylindrical cover made of either a thermally conductive material or more insulative material is placed over the two segments and then swaged over the heater element and onto the grooves.

In the exemplary embodiments of the invention shown in FIGS. 9*a*, 9*b*, 9*c* and 9*d* the semicircular or semi-cylindrical segments 85*a* and 85*b* of the heater sleeve 80" and the segments 82*a*, 82*b*; 84*a* 84*b* and 86*a*, 86*b* are manufactured according to another exemplary embodiment of the invention by using an injection molding process or a dye casting process using a mold or a dye.

Because each segment 85*a* and 85*b* of the heater sleeve 80" and the segments 82*a*, 82*b*; 84*a* 84*b* and 86*a*, 86*b* of heater sleeve 80' are semicircular and the corresponding grooves 81*a*-81*b* and 83*a*-83*b* are part of them, the segments can be molded or dye cast by creating in a single step both the curved surfaces and the grooves without the need or fear to have to deal with undercuts that make impossible the removal of the segments after molding from the mold or dye. The segments can be molded out of high thermally conductive materials such as aluminum and aluminum based materials or ceramics that can be either thermally conductive or thermally insulatine.

When using either method of manufacturing to form the heater segments (i.e. the stamping or the molding/dye casting), there is no need to use any manufacturing method that removes material such as for example by turning from a bar, as known from the state of the art.

In all the above mention heater styles or designs, the heater element is made of at least two segments that are separated by an axial or longitudinal gap. In all of these embodiments there is a single heating element that is coupled and secured to each segment to form a single unit heater.

While the invention has been illustrated and described in detail in the drawings and foregoing description, such illustration and description are to be considered illustrative or exemplary and not restrictive; the invention is not limited to the disclosed embodiments. The mere fact that certain measures are recited in mutually different dependent claims or embodiments does not indicate that a combination of these measured cannot be used to advantage.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

What is claimed is:

1. A nozzle heater assembly to be coupled to a hot runner nozzle, the heater assembly comprising:
    a heater support made of a first support segment and a separate second support segment, the second support segment being adjacent and spaced apart by at least one first gap with respect to the first support segment, wherein the first gap between the segments is transversal and/or the first gap between the segments is longitudinal; and
    a heater element secured to the first support segment and secured to the second support segment wherein the heater element is configured to mechanically connect the first support segment and the second support segment relative to each other so that the heater element limits at least said first gap, thereby reducing the inner diameter of the segments to provide improved clamping, wherein the heater element makes indirect contact with the hot runner nozzle via the support segments.

2. A nozzle heater assembly according to claim 1, wherein at least one third support segment is located between the first support segment and the second support segment, wherein the third support segment is retaining a portion of the heater element.

3. A nozzle heater assembly according to claim 1, wherein the heater element is pressed into helical grooves located on an outer surface of the first support segment and of the second support segment.

4. A nozzle heater assembly according to claim 1, wherein the first gap between the first support segment or the second support segment and a third support segment is parallel to at least one second gap between the first support segment or the second support segment and a third support segment or parallel to at least one second gap between two third support segments.

5. A nozzle heater assembly according to claim 1, wherein at least one support segment is made up of two semi-cylindrical elements that form a cylindrical support segment.

6. A nozzle heater assembly according to claim 5, wherein the first semi-cylindrical element and the second semi-cylindrical element together form a cylindrical support segment when they are mechanically connected via the heater element.

7. A nozzle heater assembly according to claim 2, wherein the first support segment and the second support segment are made of a first material and the third support segment is made of a second different material.

8. A nozzle heater assembly according to claim 7, wherein the first material is more thermally conductive than the second material, in particular the first material is a metal and the second material is a ceramic.

9. A nozzle heater assembly to be coupled to a hot runner nozzle according claim 1, wherein the heater element is U-shaped.

10. A nozzle heater assembly to be coupled to a hot runner nozzle according to claim 1, wherein the heater element is U-shaped and includes two heater branches embedded in longitudinal grooves.

11. A nozzle heater assembly to be coupled to a hot runner nozzle according to claim 1, wherein the segments are made of different materials and/or are made of materials having a different thermal conductivity.

12. A nozzle heater assembly to be coupled to a hot runner nozzle according to claim 10, wherein the heater element goes fully around and is helical over the full diameter of the heater support and goes over the longitudinal grooves.

13. A method of manufacturing a nozzle heater assembly for an injection molding nozzle comprising:
   providing two flat substrates;
   stamping the two substrates to form two semi-cylindrical components or segments of equal curvature, each segment having an inner surface and an outer surface;
   forming a series of grooves on the outer surface of the two semi-cylindrical components or segments;
   placing the two semi-cylindrical components or segments side by side with the inner surfaces facing each other;
   pressing a heater element into the grooves to secure the two segments as a single unit and provide two longitudinal gaps between the two segments.

14. A method of manufacturing a nozzle heater assembly for an injection molding nozzle comprising:
   providing a mold or a dye having a mold or a dye cavity;
   feeding a molten material into the mold or dye cavity to form a semi-cylindrical heater segment having a curved inner surface and a curved outer surface, the outer surface including a profiled groove;
   cooling the molten material in the mold or dye;
   extracting a solidified segment from the mold;
   placing the two semi-cylindrical components or segments side by side with the inner surfaces facing each other;
   pressing a heater element into the grooves to secure the two segments as a single unit and to provide two longitudinal gaps between the two segments.

15. A method of manufacturing a nozzle heater assembly for an injection molding nozzle according to claim 13, further comprising the step of swaging the heater element onto the grooves.

16. A method of manufacturing a nozzle heater assembly for an injection molding nozzle according to claim 15, further comprising the step of providing a cylindrical cover over the two segments and swaging the cylindrical cover over the heater element onto the grooves.

* * * * *